United States Patent Office 2,746,910
Patented May 22, 1956

2,746,910

ADHESIVE WAX COMPOSITION

Ivor W. Mills, Glenolden, Pa., assignor to Sun Oil Company, Philadelphia, Pa., a corporation of New Jersey No Drawing. Application March 10, 1953,
Serial No. 341,620

3 Claims. (Cl. 196—149)

This invention relates to wax compositions and more particularly to compositions containing microcrystalline wax of relatively high melting point and having high adhesiveness.

In the lamination of paper microcrystalline waxes of relatively low melting point have been used as the laminating or binding agent. Various grades of the low melting point microcrystalline waxes have sufficient adhesiveness to be useful for this purpose. On the other hand microcrystalline waxes of high melting point lack adhesive qualities and heretofore have not been considered suitable for laminating purposes. The use of low melting point waxes as the bonding agent is disadvantageous, however, as the laminated articles are not capable of withstanding elevated temperatures to which they may be exposed during use.

The present invention is directed to and provides wax compositions prepared from microcrystalline wax of relatively high melting point, which are particularly suitable for use in the lamination of paper. The compositions have unusually high adhesiveness which imparts strong bonding action in the lamination process and the resulting laminated articles are more capable of withstanding exposure to elevated temperatures during use.

Wax compositions according to the invention comprise a microcrystalline wax having a melting point above 175° F. admixed with hydrocarbon polymer derived from the treatment of cracked hydrocarbons with clay. Microcrystalline waxes melting above 175° F. generally are relatively brittle and have very poor adhesive qualities. The hydrocarbon polymer, which may be obtained from conventional clay treating of cracked gasoline such as the well known treatment by the so-called Gray process, likewise is a brittle solid. It has been found, however, that admixing these two brittle materials surprisingly yields a non-brittle, flexible waxy composition having unusually high adhesiveness as compared to any of the microcrystalline waxes per se.

The hydrocarbon polymers for use in practicing the present invention are obtainable commercially as by-products of thermal cracking operations. The cracked hydrocarbon mixture from the thermal cracking step contains various unsaturated components which desirably should be removed to improve the quality of the gasoline product. This is done conventionally by passing the cracked hydrocarbons in vapor phase through adsorptive clay which causes polymerization of unsaturated components. The polymer product is high boiling and is obtained as residue by distilling off gasoline and other liquid products. It may vary considerably in properties depending upon the particular cracked material from which it is derived but generally will be a brittle solid having a high degree of unsaturation. Generally the bromine number will be above 100 and the iodine number above 150, and the polymer will have a softening point above 125° F. The following is a typical set of properties for this polymer product:

| | |
|---|---:|
| Softening point °F | 149 |
| Penetration @ 115° F. | 26 |
| Flash °F | 450 |
| Fire °F | 505 |
| Saybolt Furol viscosity @ 210° F. | 2465 |
| Saybolt Furol viscosity @ 250° F. | 251 |
| Bromine No. | 135 |
| Iodine No. | 242 |
| Saponification No. | 7.4 |

The microcrystalline wax employed is a high melting grade having low adhesive qualities, generally having a melting point above 175° F. Preferably the melting point is in the range of 185–195° F. The polymer may be added to it in any necessary or desired amount effective to impart a high degree of adhesiveness to the wax, but usually the amount of polymer employed will lie within the range of 5–45% by weight of the mixture.

In the example given below by way of illustration of the invention, adhesion of the wax was determined by a heretofore unpublished test procedure conducted as follows:

Two glassine paper sheets, each 4" x 6", are weighed and one is then placed on a hot surface maintained at a temperature sufficiently high to melt the wax but insufficient to scorch the paper. The wax to be tested is rubbed on the upper side of the heated paper until the surface is entirely coated. The other glassine paper sheet is then placed upon the waxed surface and pressed against it by hand, and the bonded sheets are rubbed to remove excess wax and any air bubbles. The amount of wax, determined by weighing the laminated sheets, is adjusted to about 0.20 gram (equivalent to 8.0 lbs. of wax per ream of laminated paper). The laminated sheets are then cut longitudinally to yield 2" x 6" test strips. Before testing, the strips are conditioned for one hour in a controlled atmosphere maintained at about 73° F. and 50% relative humidity.

In conducting an adhesion test the layers of a test strip are first separated by hand at one end for a distance of about 1.5". One of the separated portions is tied to a Jolly spring having a fixed opposite end, while the other separated portion is attached to a string which is secured to the drive shaft of a motor having a speed of 1 R. P. M. and positioned to pull against the spring. The Jolly spring is calibrated so that the force in grams required to effect any given amount of extension of the spring is known. Adhesion of the wax sample is then determined by operating the motor and noting the maximum extension of the spring necessary to pull apart the laminated paper sheets. The test is conducted at a controlled temperature of about 73° F.

Example

The original wax was a brittle microcrystalline wax having a melting point of 192° F., a penetration of 5 at 77° F., and an adhesion of about 7 g. according to the aboxe described test procedure. A blend was prepared consisting by weight of 80% of this wax and 20% of hard, brittle hydrocarbon polymer having the properties tabulated above. It was found that the mixture was a flexible, non-brittle product with a melting point of 190° F. and an adhesion of 160 g. Thus, addition of the polymer to the wax had little effect on melting point but resulted in a large improvement in adhesiveness. By way of comparison, the best laminating waxes in the low melting point microcrystalline range have adhesion values of only about 70 g.

The foregoing example shows that the adhesiveness of high melting point microcrystalline wax, which is normally below 20 g. according to the test herein described, can readily be increased to above 100 g. by incorporating therein a minor amount of hydrocarbon polymer according to the present invention.

I claim:
1. An adhesive wax composition consisting essentially of a microcrystalline wax having a melting point above 175° F., and a hydrocarbon polymer derived from treatment of cracked gasoline with clay, said polymer having a bromine number above 100, an iodine number above 150, and a softening point above 125° F., the amount of such polymer being sufficient to substantially increase adhesion.

2. An adhesive wax composition comprising 55–95 parts of microcrystalline wax having a melting point above 175° F. and 5–45 parts of hydrocarbon polymer derived from treatment of cracked gasoline with clay, said polymer having a bromine number above 100, an iodine number above 150, and a softening point above 125° F.

3. A wax composition comprising a major portion of a relatively high melting microcrystalline wax having an adhesion of less than 20 g. and a minor portion of a hydrocarbon polymer derived from treatment of cracked gasoline with clay, said polymer having a bromine number above 100, an iodine number above 150, and a softening point above 125° F., the amount of such polymer being sufficient to raise the adhesion to above 100 g.

References Cited in the file of this patent

UNITED STATES PATENTS

| | | |
|---|---|---|
| 2,194,439 | Chitlick | Mar. 19, 1940 |
| 2,361,582 | Adams | Oct. 31, 1944 |
| 2,529,322 | Zimmer et al. | Nov. 7, 1950 |
| 2,595,158 | McCue et al. | Apr. 29, 1952 |
| 2,599,130 | Rumberger et al. | June 3, 1952 |
| 2,648,643 | Adams et al. | Aug. 11, 1953 |